United States Patent
Kato et al.

(10) Patent No.: US 6,493,170 B1
(45) Date of Patent: Dec. 10, 2002

(54) INTERFERENCE DEVICE AND POSITION DETECTION DEVICE USING THE SAME

(75) Inventors: Shigeki Kato, Utsunomiya (JP); Ko Ishizuka, Ohmiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/327,166

(22) Filed: Jun. 7, 1999

(30) Foreign Application Priority Data

Jun. 8, 1998 (JP) .......................................... 10-175366

(51) Int. Cl.⁷ .............................................. G11B 21/02
(52) U.S. Cl. ...................................... 360/75; 369/44.37
(58) Field of Search ................................ 356/498, 508, 356/510, 358; 360/75, 77.01, 77.02, 78.01, 78.04, 77.03, 78.11; 369/126, 44.15, 44.17, 44.21, 44.37

(56) References Cited

U.S. PATENT DOCUMENTS

| | | | |
|---|---|---|---|
| 5,283,434 A | 2/1994 | Ishizuka et al. | 250/237 G |
| 5,390,022 A | 2/1995 | Ishizuka et al. | 356/499 |
| 5,448,358 A | 9/1995 | Ishizuka et al. | 356/619 |
| 5,481,106 A | 1/1996 | Nyui et al. | 250/237 G |
| 5,483,377 A | 1/1996 | Kaneda et al. | 359/566 |
| 5,498,870 A | 3/1996 | Ishizuka | 250/237 G |
| 5,502,466 A | 3/1996 | Kato et al. | 356/499 |
| 5,557,396 A | 9/1996 | Ishizuka et al. | 356/28.5 |
| 5,569,913 A | 10/1996 | Ishizuka et al. | 250/237 G |
| 5,621,527 A | 4/1997 | Kaneda et al. | 356/499 |
| 5,663,794 A | 9/1997 | Ishizuka | 356/499 |
| 5,666,196 A | 9/1997 | Ishii et al. | 356/499 |
| 5,680,211 A | 10/1997 | Kaneda et al. | 356/499 |
| 5,737,070 A | 4/1998 | Kato | 356/28.5 |
| 5,737,116 A | 4/1998 | Kadowaki et al. | 359/359 |
| 5,754,282 A | 5/1998 | Kato et al. | 356/28.5 |
| 5,796,470 A | 8/1998 | Ueda et al. | 356/28.5 |
| 5,815,267 A | 9/1998 | Kato et al. | 356/486 |
| 5,880,839 A | 3/1999 | Ishizuka et al. | 356/499 |
| 5,926,276 A | 7/1999 | Takamiya et al. | 356/494 |
| 5,956,140 A | 9/1999 | Ishizuka et al. | 356/494 |
| 6,151,185 A * | 11/2000 | Ishizuka et al. | 360/78.04 |

* cited by examiner

Primary Examiner—Regina N. Holder
Assistant Examiner—Mitchell Slavitt
(74) Attorney, Agent, or Firm—Fitzpatrick, Cella, Harper & Scinto

(57) ABSTRACT

In an interference device, an elastic member elastically contacts a portion of an object to be detected. An optical probe is so constructed that light emitted from a light source is split into two light beams one of which is reflected by a reference reflecting surface thereof and the other of which is reflected by a reflecting surface formed on the elastic member, and both reflected light beams are mixed. In a sensor, an interference signal is obtained from the light mixed by the optical probe so as to obtain position information of the object to be detected from the interference signal. The reflecting surface on the elastic member is set to have a width substantially the same as a diameter of the other light beam to be incident on the reflecting surface.

12 Claims, 6 Drawing Sheets

INTERFERENCE DEVICE AND POSITION DETECTION DEVICE USING THE SAME

BACKGROUND OF THE INVENTION

1. Field of the Invention

The present invention relates to an interference device. for detecting a positional displacement of an object, a position detection device for detecting position information of an object such as a magnetic head of a hard disk drive, using the interference device, an alignment device, and a servo signal write device using the alignment device.

The present invention is suitably applied to a manufacturing apparatus of a hard disk drive (to be abbreviated as an HDD hereinafter) used in a computer and, more particularly, to a device for accurately writing a servo track signal on a hard disk in the HDD.

2. Related Background Art

FIG. 1A is an explanatory view of a conventional device for writing a servo track signal on a hard disk in an HDD. Referring to FIG. 1A, a hard disk drive HDD has a hard disk RD, slider SLID, magnetic arm ARM1, voice coil motor VCM, spindle OHD (rotation Center) of the hard disk HD, and rotation axis O of the magnetic head arm ARM1.

A magnetic recording medium is deposited on the surface of the hard disk HD. The hard disk HD always rotates at high speed about the spindle OHD, and a magnetic head is placed in the vicinity of the surface of the hard disk HD. The magnetic head is built in a nearly parallelepiped portion called the slider SLID, which is attached to the distal end of the magnetic head arm ARM1 having the rotation center O outside the hard disk HD. When the magnetic head arm ARM1 is rotated by the voice coil motor VCM, the magnetic head can radially relatively move above the hard disk HD.

With this arrangement, the rotating hard disk HD and the magnetic head which moves along an arcuated path can read/write magnetic information at an arbitrary position (track) on the surface of the disk-shaped hard disk HD.

In the magnetic recording method on the surface of the hard disk HD, the hard disk HD is divided into a plurality of annular tracks which are concentric to the rotation center OHD of the hard disk and have different radii. Each annular track is divided into a plurality of arcs. Finally, information is time-sequentially recorded on/reproduced from a plurality of arcuated areas in the circumferential direction.

As a recent trend, an increase in recording capacity of the hard disk is required to record information on the hard disk at higher density. In order to record information on the hard disk at higher density, a method of decreasing the width of each concentrically divided track to increase the recording density in the radial direction is effective.

The recording density in the radial direction is expressed by a track density TPI (track/inch), and is currently around 10,000 TPI. This means that the track spacing is about 3 microns. In order to detect such small track pitch, the magnetic head must be aligned at a resolution (0.05 microns) around 1/50 the track width in the radial direction to write a servo track signal in advance. To do this, it is important to devise a technique that can sequentially write servo track signal while aligning the magnetic head at high resolution within a short period of time.

FIG. 1A also depicts a conventional alignment device used for writing a servo track signal. The device shown in FIG. 1A comprises a push rod PROD, an arm ARM2 for the push rod PROD, an alignment control motor MO, a rotary encoder RE for detecting the rotational amount of the rotation shaft of the motor MO, a signal processor SP1 for analyzing the detection output from the rotary encoder RE, and generating an alignment command signal of the magnetic head to the write position of a servo track signal, and a motor driver MD for driving the motor MO in response to the command signal from the signal processor SP1.

Conventionally, as shown in FIG. 1A, the cylindrical surface of the push rod PROD is pressed against the side surface of the magnetic head arm ARM1, and the magnetic head is aligned while sequentially stepping the magnetic head arm ARM1 via the push rod PROD by rotating the arm ARM2 using the motor MO under the feedback control by the system including the rotary encoder RE, signal processor SP1, and motor driver MD. In this way, a servo track signal from a signal generator SG is sequentially written at each position. At this time, in order to assure contact, a current is slightly supplied to the voice coil motor VCM to also press the push rod PROD from the head arm ARM1 side. However, further improvements in performance upon writing information such as servo track signals at high density are demanded by realizing more accurate alignment of a rotary positioner system RTP in consideration of vibrations upon rotation of the hard disk HD.

Recently, to realize high-precision alignment, a method of measuring movement of a magnetic head arm using an optical means in place of mechanically pressing the magnetic head arm has been proposed. FIG. 1B shows an example of a device using an optical alignment means.

Referring to FIG. 1B, the device includes a (helium-neon) laser source HeNe, mirrors M1 and M2, a beam splitter BS, a retroreflector CC like a corner cube placed at a given portion on a magnetic head arm ARM1 and a light-receiving element PD.

In this device, the laser source HeNe, mirrors M1 and M2, beam splitter BS, and retroreflector CC construct a Michelson interferometer. Interference light obtained by bringing a light beam L1 via the retroreflector CC and mirror M2 and a light beam L2 via the mirrors M1 and M2 to interference is detected by the light-receiving element PD to obtain the position information of the magnetic head arm ARM1. Based on the obtained detection signal, a signal processor SP1 generates a command and controls a current to be supplied from a voice coil motor VCMD to a voice coil motor VCM to directly move the magnetic head arm ARM1, thus achieving appropriate control.

However, in such device, the retroreflector CC like a corner cube must be placed on the magnetic head arm ARM1, thus posing problems about the space to be assured, attachment/detachment of the retroreflector, poor control characteristics due to an increase in weight, and the like.

SUMMARY OF THE INVENTION

It is an object of the present invention to provide an interference device, position detection device, and alignment device, which can detect position information of an object such as a magnetic head arm with high reliability and high precision and at high resolution without arranging any special member on the object side, can align the object without placing any specific member on the object side, and can stably measure position information of a magnetic head arm of a hard disk, whose rotational speed is becoming higher year by year, irrespective of an air flow in a hard disk housing, and a servo signal write device using them.

Other objects of the present invention will become apparent from the following description of the embodiments.

DESCRIPTION OF THE PREFERRED EMBODIMENTS

Figure 1A:
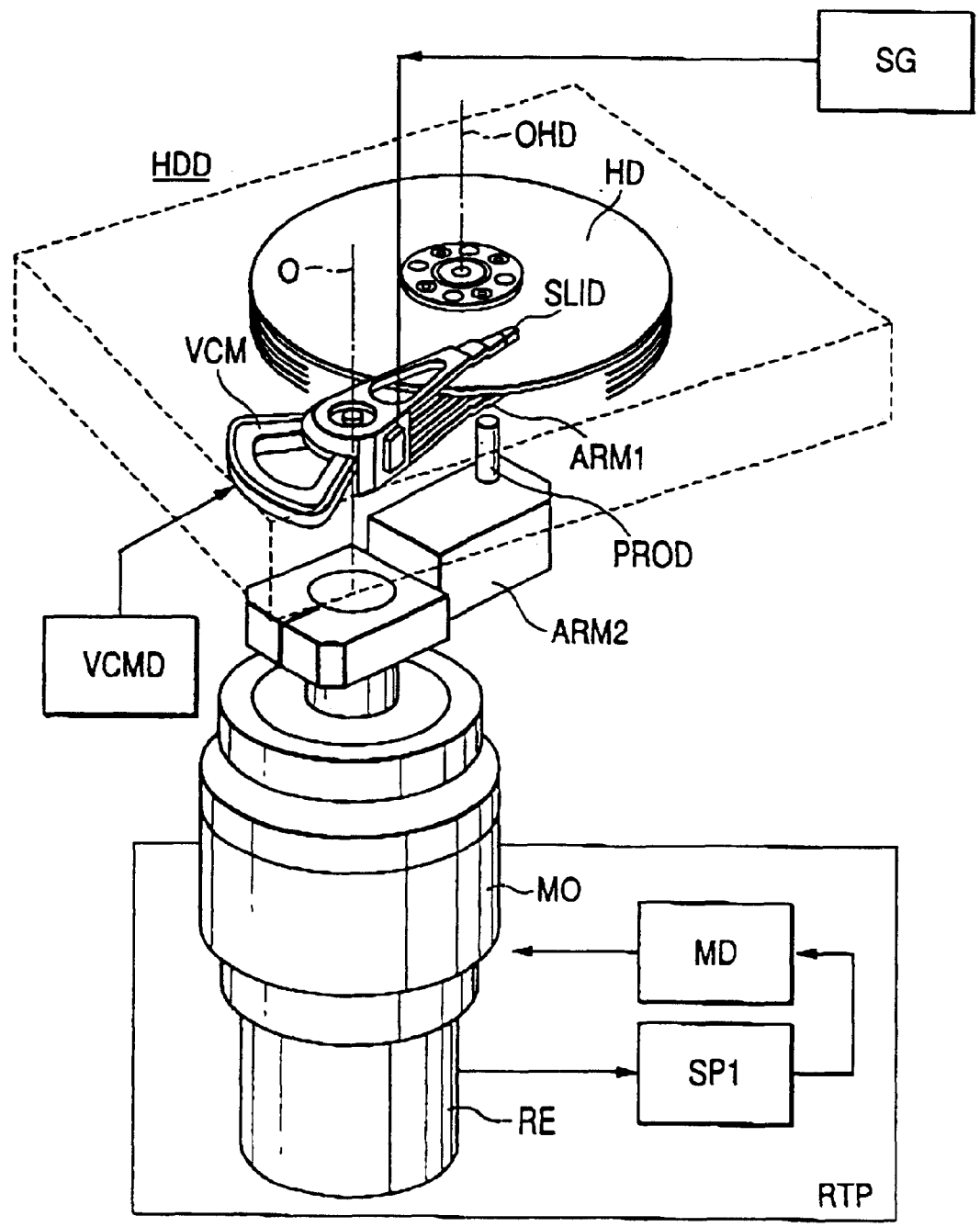
FIG. 1A is an explanatory view of a hard disk drive and a conventional servo track signal write device using a push rod.
Figure 1B:
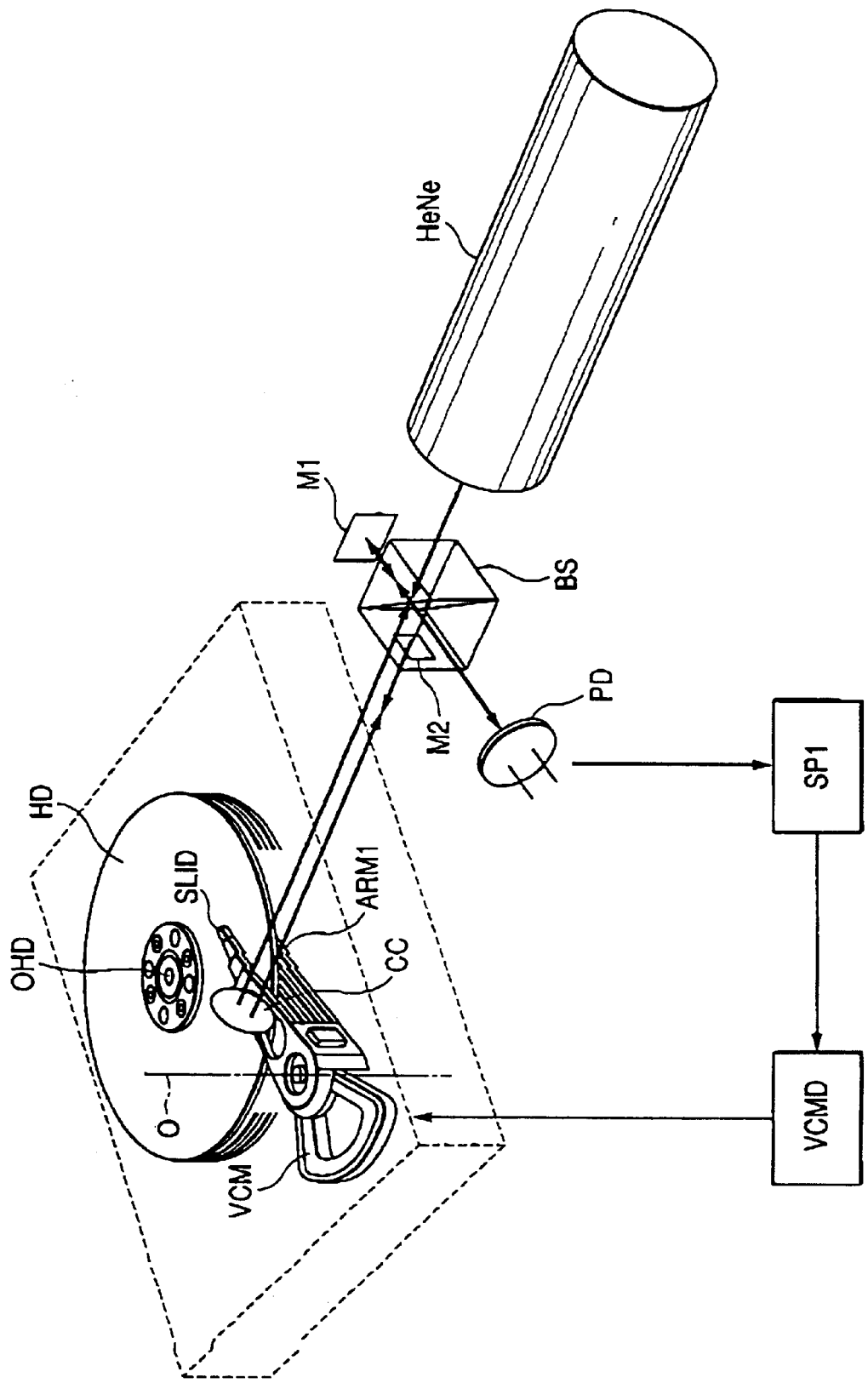
FIG. 1B is an explanatory view of a hard disk drive and a conventional servo track signal write device using a retroreflector interference distance measuring device.
Figure 2A:
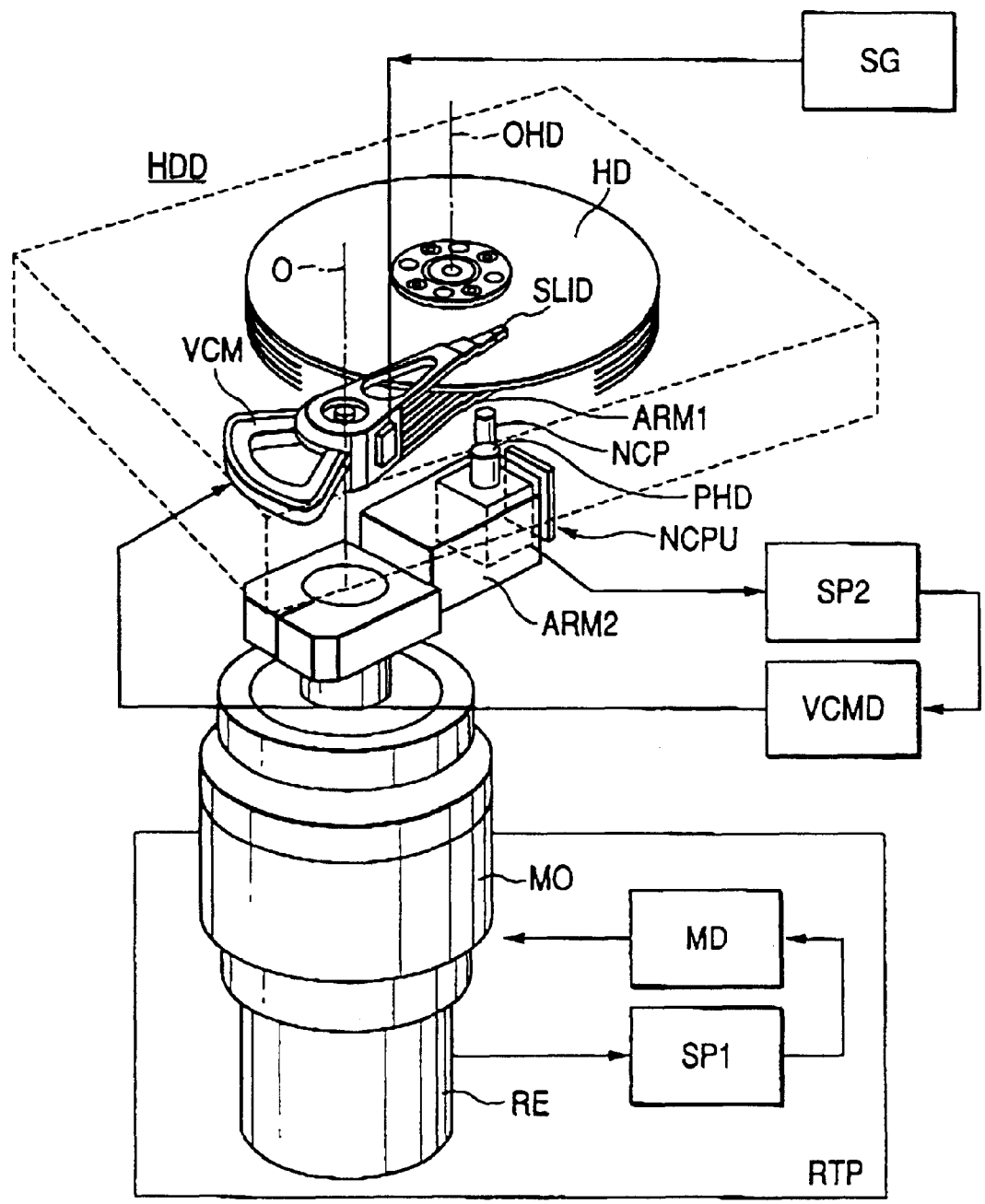
FIG. 2A is a schematic perspective view showing a servo track signal write device according to the first embodiment of the present invention.

FIG. 2A is a schematic view showing the first embodiment of a device (servo signal write device) for writing a servo track signal by an interference device and a position detection device using the device according to the present invention. Note that the same reference numerals in FIG. 2A denote the same parts as in FIG. 1A.

Referring to FIG. 2A, a hard disk HDD has a hard disk HD, slider SLID, magnetic arm ARM1, voice coil motor VCM, spindle OHD (rotation center) of the hard disk HD, and rotation axis O of the magnetic head arm ARM1.

A magnetic recording medium is deposited on the surface of the hard disk HD. The hard disk HD always rotates at high speed about the spindle OHD, and a magnetic head is placed in the vicinity of the surface of the hard disk HD. The magnetic head is built in a nearly parallelepiped portion called the slider SLID, which is attached to the distal end of the magnetic head arm ARM1 having the rotation center O outside the hard disk HD. When the magnetic head arm ARM1 is rotated by the voice coil motor VCM, the magnetic head can radially relatively move above the hard disk HD.

With this arrangement, the rotating hard disk HD and the magnetic head which moves along an arcuated path can read/write magnetic information at an arbitrary position (track) on the surface of the disk-shaped hard disk HD.

The magnetic head arm ARM1 having the rotation axis O outside the hard disk HD is attached to the hard disk d rive HDD, and the slider SLID attached to the distal end of the magnetic head arm ARM1 opposes the hard disk surface to have a gap of 0.5 $\mu$m (or less) and moves along an arcuated path upon rotation of the magnetic head arm ARM1. Rotation is achieved by supplying a current to the voice coil motor VCM.

Such device is placed at a spatially appropriate position with respect to the hard disk drive HDD comprising the hard disk HD, slider SLID, magnetic head arm ARM1, voice coil motor VCM, and the like, as shown in FIG. 2A.

A signal generator SG generates a servo track signal to be written on the hard disk. The servo track signal is written on the hard disk HD via the magnetic head of the slider SLID.

A position detection unit NCPU is set in a support arm (rotary arm, positioner arm) ARM2, and the distal end portion of an optical probe NCP is inserted into an elongated aperture (not shown) in a base plate of the hard disk drive HDD to be located in the vicinity of the side surface of the magnetic head arm ARM1. The support arm ARM2 is placed so that it can rotate about a rotation axis coaxial with the rotation center O of the magnetic head arm ARM1. The rotational position of the position detection unit NCPU is detected by a high-resolution rotary encoder RE attached to the rotation axis O of the support arm ARM2, and a signal processor SP1 rotates a motor MO via a motor driver MD on the basis of the detection data of the rotary encoder RE. With this feedback control, the rotational position of the position detection sensor unit NCPU is aligned.

Note that the motor MO, rotary encoder RE, motor driver MD, and signal processor SP1 are building components of a rotary positioner (positioner) RTP.

In this embodiment, the position detection unit NCPU is fixed to the arm ARM2 of the rotary positioner RTP, a leaf spring member SP that elastically contacts the side surface of the magnetic head arm ARM1 is fixed to the position detection unit NCPU, a light reflecting portion provided to the leaf spring member SP is irradiated with a light beam output from a sensor probe PH, and the extracted reflected light and another light beam are brought to interference so as to measure the position of the leaf spring member SP. In this way, the relative distance between the side surface of the magnetic head arm ARM1 and the position detection unit NCPU of the rotary positioner RTP is stably measured, and the rotation motor (VCM) of the magnetic head arm ARM1 is controlled to make that measurement value constant.

In this case, in order to eliminate the influence of wind caused upon rotation of the hard disk HD, which rotates at high speed, the width of the leaf spring member is set to be equal to the spot size of the light beam emerging from the position detection unit at its detection position.

Note that the position detection unit NCPU is constructed by an optical sensor unit (interference device) to be described below.

Figure 2B:
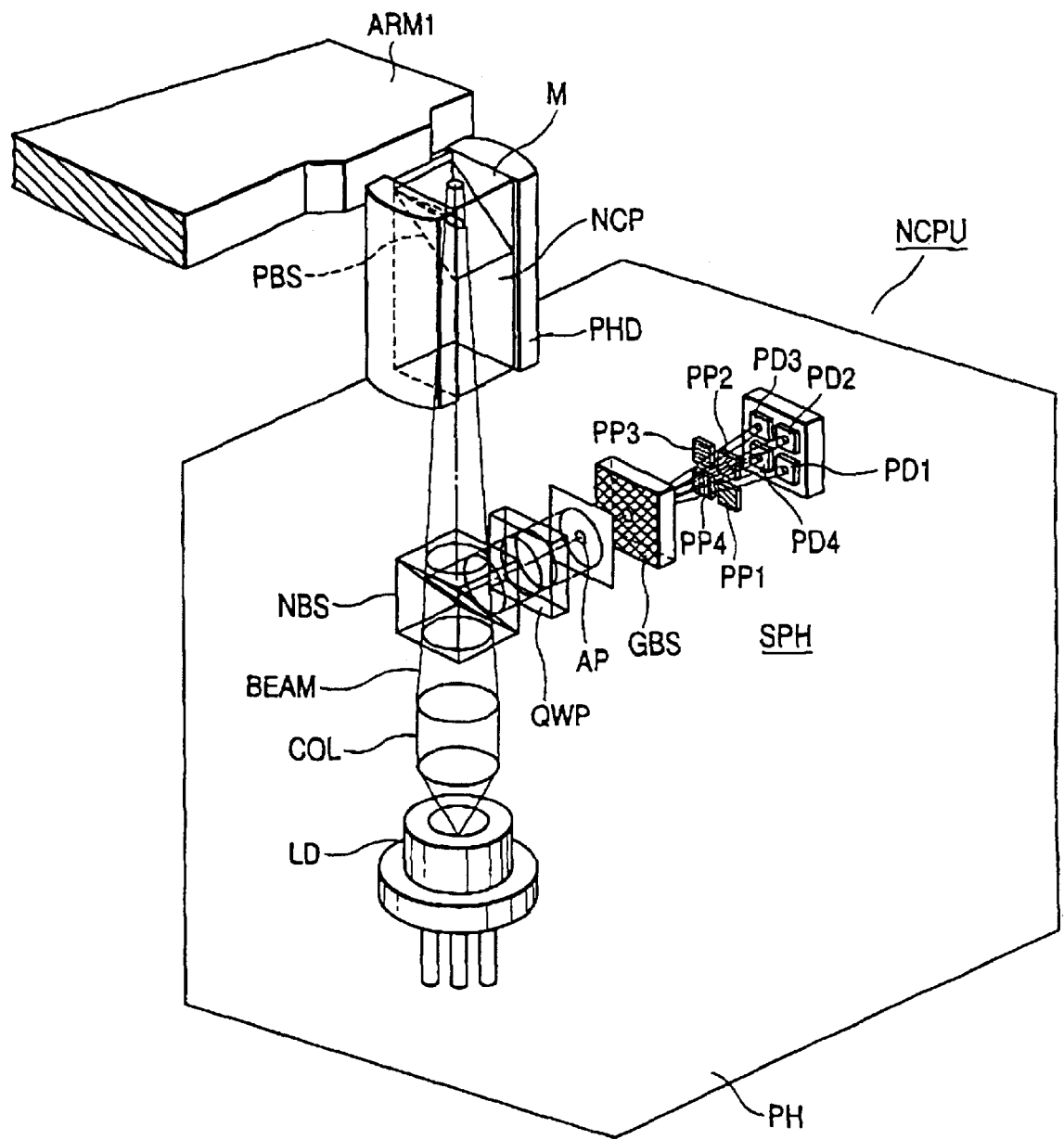
FIG. 2B is an explanatory view of an optical non-contact distance sensor unit and a detailed view of a probe holder in the servo track signal write device shown in FIG. 2A.
Figure 3:
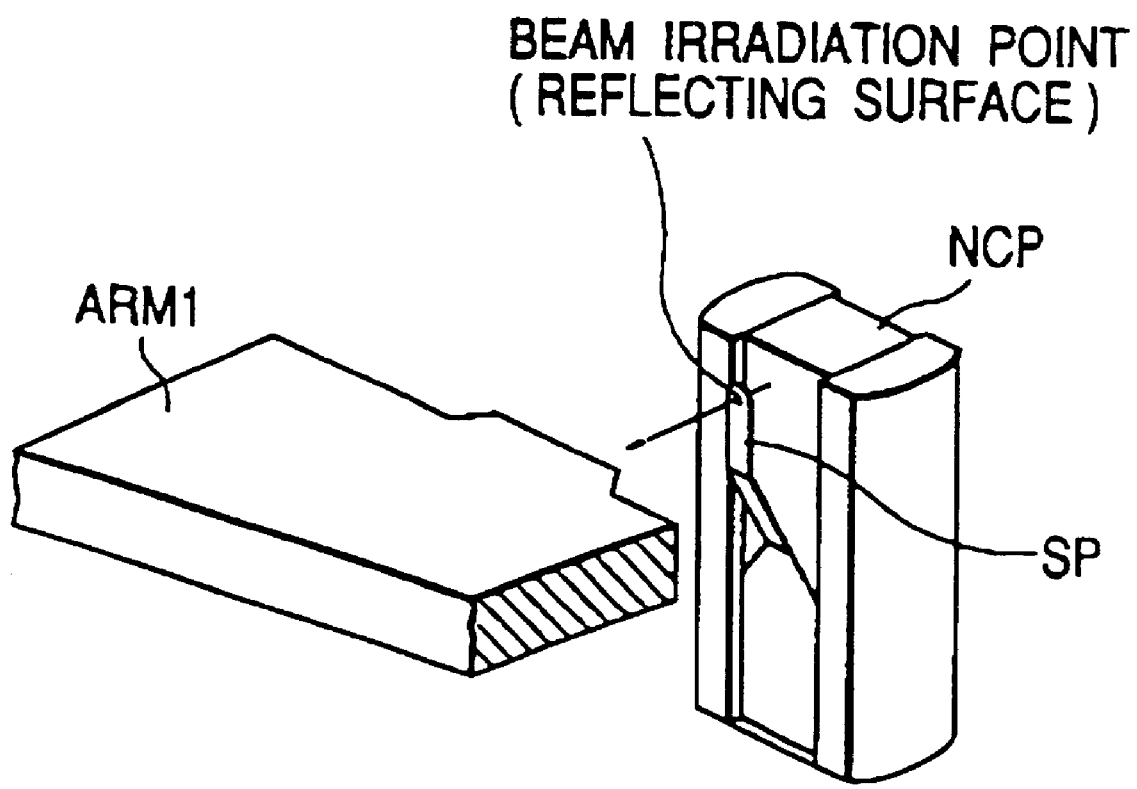
FIG. 3 is an explanatory view of an optical non-contact distance sensor unit and a detailed view of a probe holder in the servo track signal write device shown in FIG. 2A.

FIGS. 2B and 3 are explanatory views showing the arrangement of an optical system to explain the optical sensor unit which constructs the position detection unit (interference device) shown in FIG. 2A. An optical sensor unit NCPU has a sensor probe SPH including a multi-mode laser diode LD, a non-polarization beam splitter NBS, a quarter wave plate QWP, a spot size limiting aperture AP, a diffraction grating GBS for splitting a light beam amplitude, polarization plates PP1 to PP4, photoelectric elements PD1 to PD4, and the like, and an optical probe (light guide member) NCP. A probe holder PH holds the respective components of the sensor probe SPH.

In the sensor probe SPH, divergent light emitted by the multi-mode laser diode LD is converted into a weakly convergent light beame BEAM via a collimator lens COL, and is split into transmitted light and reflected light by the non-polarization beam splitter NBS.

Light transmitted through the non-polarization beam splitter NBS is split into polarized light components by a probe-like polarization prism PBS supported by a probe holder PHD of the optical probe NCP. Of these components, by an s-polarized light beam reflected by the prism PBS irradiation is effected at a position near its beam waist on an elastic member, for example, a leaf spring member SP, which is placed in a space about 300 μm separated from the end face of the probe-like polarization prism PBS, and is fixed to the optical probe NCP. The leaf spring member SP contacts the magnetic head arm ARM1 as an object to be detected near the beam irradiation point near the beam waist, and has appropriate resiliency in the direction toward the magnetic head arm ARM1. More specifically, when the leaf spring member SP approaches the magnetic head arm ARM1 and is pushed to a position near the beam waist, it follows movement of the magnetic head arm ARM1.

Light (signal light) reflected by the leaf spring member SP returns as a divergent spherical wave to the probe-like polarization prism (beam splitting surface) PBS along the aforementioned optical path. Meanwhile, a p-polarized light beam transmitted through the probe-like polarization prism PBS is converged so that a reflecting deposition film is irradiated with it on the end face (reference reflecting surface) at a position deviating from its beam waist. Light (reference light) reflected by the deposition film returns to the probe-like polarization prism PBS along the above-mentioned optical path. Note that these two light beams have nearly equal optical path lengths in terms of wave-optics within the coherence length of the light source.

For example, the prism shape is defined as follows. If the probe-like polarization prism PBS in the optical probe NCF formed of glass has a width around 2 mm, a light beam reflected by the polarization prism PBS travels 1 mm in glass (NCP), travels around 0.3 mm in air from the beam exit surface of the polarization prism, and is irradiated on the reflecting surface of the leaf spring member SP. Hence, the round-trip optical path length in terms of wave-optics from the polarization prism PBS to the reflecting surface SP is given by:

$$L1=(1\times1.5+0.3)\times2=3.6$$

On the other hand, a light beam transmitted through the polarization prism PBS propagates 1.2 mm in glass, and is irradiated on the glass end face (reference reflecting surface M). Hence, its round-trip optical path length in terms of wave-optics is given by:

$$L2=(1.2\times1.5)\times2=3.6$$

Note that the refractive index of glass (NCP) is 1.5.

The focusing position (beam waist) of the light beam is set at a position 0.3 mm apart from the exit surface of the polarization prism PBS.

Then, wave sources of the divergent spherical waves reflected by the leaf spring member SP and reference reflecting surface M are seen at positions deviating in the optical axis direction. Assuming that the interior of the probe-like polarization prism PBS is observed from the light source side, the focusing point (wave source) of the leaf spring member SP is seen at a position:

$$L1'=(1+0.3\times1.5)=1.45$$

apart From the splitting surface of the polarization prism PBS. On the other hand, the wave source of the divergent spherical wave surface from the reference reflecting surface is seen at a position:

$$L2'=1.2\times2+1.45=0.95$$

apart from the splitting surface of the polarization prism PBS. Note that these positions are seen in glass.

Hence, the two divergent spherical wave sources deviate by 0.5 mm in glass. Then, upon superposing the two light beams, their wavefronts do not perfectly agree with each other. If polarized light components of these two light beams are brought to interference, concentric interference fringes are obtained. In this case, when the phases of their wavefronts vary upon relative movement of the leaf spring member, concentric interference fringes which appear from or are sucked down into the center are observed.

However, since the two divergent spherical waves have a deviation in the optical axis direction as small as about 0.5 mm, those concentric interference fringes form a broad, substantially one-color interference fringe portion at their center. Hence, some light beam components are extracted by inserting an appropriate aperture AP that can extract substantially only the one-color portion. The extracted light beam components can be handled as a nearly plane wave.

Since the two light beams mixed by the probe-like polarization prism PBS are linearly polarized light components orthogonal each other, a density signal (bright and dark signals) cannot be obtained as a result of their interference. When the two light beams are reflected by the non-polarization beam splitter NBS and are transmitted through the quarter wave plate QWP, the orthogonal linearly polarized light components are converted into circularly polarized light components having opposing directions of rotation. When their planes of vibrations are synthesized as vectors, the two circularly polarized light components are converted into single linearly polarized light that rotates in correspondence with a variation of their phase difference.

The rotating linearly polarized light is amplitude-split into four light beams by the phase diffraction grating GBS having a staggered grating structure. More specifically, since the nature, i.e., the shape, intensity nonuniformity, defect, and the like of the linearly polarized light is equally amplitude-split into four light beams, even when a one-color interference fringe portion cannot be formed or contrast drops due to any causes, their influences are also equally split.

Especially, the wavefront of light reflected by the leaf spring member SP is disturbed by a micro three-dimensional structure, and suffers strong intensity nonuniformity. The four split light beams have equal disturbed states of the wavefronts and intensity nonuniformity.

The four split light beams are transmitted through the polarization plates (analyzers) PP1 to PP4 which are placed to have their directions of polarization displaced at 45° increments, so as to be converted into interference light components whose density timings have 90° phase differences. These four light components are equally influenced by contrast drop resulting from the disturbed wavefronts and intensity nonuniformity. The density light beams are received by the light-receiving elements PD1, PD2, PD3, and PD4.

The signals output from the light-receiving elements PD1 and PD2 having a 180° phase difference are differentially detected to remove nearly all DC components (contrast drop components due to the disturbed wavefronts and the like), thus obtaining an A-phase signal.

Likewise, the signals output from the light-receiving elements PD3 and PD4 having a 180° phase difference are differentially detected to remove nearly all DC components (contrast drop components due to the disturbed wavefronts and the like), thus obtaining a B-phase signal. The phase difference between the A- and B-phase signals is 90°, and a Lissajous waveform observed via an oscilloscope is circular. The amplitude (the size of circle) of the Lissajous waveform varies depending on the micro three-dimensional patterns on the leaf spring member SP but its central position does not vary. Hence, essentially no error is produced in phase detection (relative distance measurement).

Also, by illuminating the leaf spring member with a focusing light beam, the influence of a variation of the interference state (one-color shift) arising from a relative angular error (alignment error) of the leaf spring member SP is avoided. More specifically, even when the leaf spring member suffers any alignment error, the main exit direction of the divergent spherical wave slightly shifts but the spherical wave itself can be prevented from being eclipsed by focusing illumination. Also, since the superposing state of the wavefronts of the two divergent spherical waves remains the same, stable interference can be obtained. Hence, the position detection unit can operate as an interference position detection sensor which is free from any adjustment between the side surface of the magnetic head arm ARM1 and illumination light beams, and is very easy to handle.

An illumination position error (parallel error) does not have any influence on the phase shift of the divergent spherical wave but is converted into a variation of amplitude of the interference signal due to a change in micro three-dimensional state of the leaf spring member SP depending on the illumination position.

However, since the central position of the Lissjous waveform does not vary, essentially no error is produced in phase detection.

The positional relationship between the magnetic head arm ARM1 and position detection unit NCPU changes as the leaf spring member SP deforms, thus producing an angular error and parallel error. However, as described above, even when an alignment error or parallel error has occurred, essentially no problem is posed.

Note that the finally detected signal is a sine wave signal having a period corresponding to half the wavelength of the light source since interference distance measurement in round-trip optical paths is used. When a laser diode having a wavelength of 0.78 $\mu$m is used, a sine wave signal having a period of 0.39 $\mu$m is obtained, and a relative distznce variation can be detected by counting the number of waves. Furthermore, since two phases of sine wave signals having a 90° phase difference are obtained, a relative position displacement can be detected with higher resolution by electrically dividing the signal using a known electrical phase dividing device. When the signal is electrically divided into 4,096 components, a minimum relative position displacement of 0.095 nm can be detected. When a current is supplied to the head arm driving motor (voice coil) by an appropriate controller to obtain zero relative position displacement, the relative position can be stably held (servo-controlled) within about several integer multiples of ±0.095 nm.

Using the high-precision rotary positioner RTP which incorporates the rotary encoder RE that generates 81,000 sine wave signals/rotation, and can align by dividing each signal into 2,048 components, the position detection sensor attached in the vicinity of the side surface of the head arm having a radius of 30 mm can be aligned at a resolution corresponding to several integer multiples of ±1.4 nm.

Since the relative position stability of the position detection sensor itself is around several integer multiples of ±0.095 nm, the alignment resolution of a combination of the sensor and positioner is nearly equivalent to the performance of the high-precision rotary positioner.

As described above, in this embodiment, since servo control for maintaining a constant end face position of the magnetic head arm ARM1 via the position detection unit NCPU is added to the high-precision rotary positioner RTP, stable alignment precision is obtained without applying any disturbance to the high-precision positioner.

Figure 4:
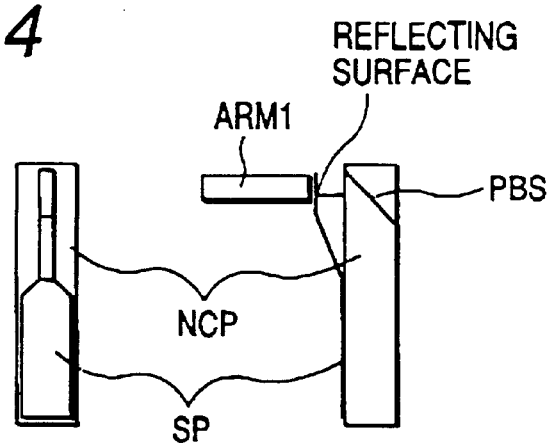
FIG. 4 is a schematic view of a glass probe portion of a sensor as a characteristic feature of the servo track write device according to the first embodiment of the present invention.

The leaf spring member SP as the characteristic feature of the present invention will be explained below with reference to FIGS. 3 and 4. The leaf spring member SP has a light reflecting surface, as described above. A portion which includes the light reflecting surface and has resiliency has a width slightly larger than the spot size near the beam waist of the light beam output from the position detection unit. Fully considering the astigmatism of the laser, the aberrations of the collimator lens, spherical aberration produced upon transmission through the glass probe, and the like, the spot size near the beam waist is set at 0.2 mm, and the position displacement upon attaching the spring is around 0.2 mm. Then, a leaf spring having a width around 0.5 mm is most suitable. In the hard disk housing, the magnetic disk HD is rotating at a speed as high as 10,000 rpm, and the peripheral velocity of the disk in a 3.5" hard disk drive reaches about 40 m/s, As is easily understood from the above description, a considerably high wind pressure acts on the leaf spring member of the interference device. Since the wind pressure a plate member receives is a function proportional to its area, if the width of the plate member is halved, the wind pressure is also reduced to ½.

Compared to a case wherein a spring having a width equal to that of the optical probe is attached, the wind pressure acting on a 0.5-mm wide spring is reduced to ¼. If the spring is attached after alignment and the width of the leaf spring member is reduced to 0.2 mm equal to the spot size, the wind pressure is reduced to ¹⁄₁₀ compared to the 2-mm wide spring. Since the resiliency of the leaf spring member can be adjusted by its thickness, the 0.2-mm wide spring can have resiliency equal to that of the 2-mm wide spring. Hence, evidently the leaf spring member of this embodiment is invulnerable to wind in the hard disk housing.

Also, a leaf spring with a small width like in this embodiment has higher torsional rigidity than a leaf spring having a large width and an identical spring constant. Hence, even when an alignment error has occurred between the magnetic head arm ARM1 and position detection unit NCPU, the leaf spring member SP can contact the side surface of the magnetic head arm ARM1 without following it.

In other words, the light reflecting surface formed on the leaf spring member SP is maintained at an optimal position irrespective of alignment of the object to be measured (magnetic head arm ARM1), and a maximum interference signal can be obtained.

Note that this embodiment can use any other elastic members such as rubber, ring spring, and the like in place of the leaf spring member, as long as they elastically deform.

The effects obtained by this embodiment will be explained below.

(a-1) When the leaf spring member SP fixed to the optical probe NCP is irradiated with a light beam from the sensor probe SPH, and the leaf spring member SP is brought into tight contact with the magnetic head arm ARM1 by its resiliency, the positional relationship between the magnetic head arm ARM1 and sensor probe SPH can be measured independently of the surface characteristics of the magnetic head arm ARM1 as the object to be measured.

In this case, since the width of the leaf spring member is set to be nearly equal to the spot size near the beam waist of the light beam from the sensor, the influence of wind in the hard disk on the position measurement can be greatly reduced.

(a-2) Since the torsional rigidity of the spring is improved using the leaf spring member SP with the aforementioned width, the alignment precision between the object to be measured (magnetic head arm) and sensor probe SPH can be relaxed.

(a-3) Since the side surface of the magnetic head arm ARM1 is measured in a contact state via the leaf spring member SP, high versatility is assured, and no special optical member or the like need be added to the hard disk side (vs. interference distance measurement using a corner cube).

(a-4) Since the equal optical length interference system is used, relatively high precision is assured even when temperature drift has occurred (vs. interference distance measurement using a corner cube).

(a-5) Since most of the interference optical path is a common optical path, and most of split optical paths are present in glass, precision drop resulting from an environment variation is small.

Figure 5:
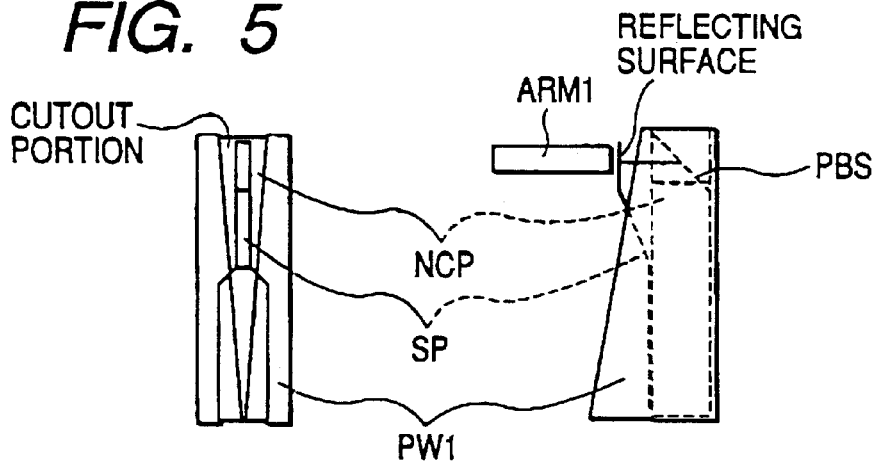
FIG. 5 is a schematic view of a glass probe of a sensor as a more characteristic feature than the first embodiment in a servo track signal write device according to the second embodiment of the present invention.

FIG. 5 is a partial schematic view of the second embodiment of the present invention. FIG. 5 is a schematic view of an optical probe NCP portion, which is more outstanding characteristic feature of the present invention than the first embodiment, in the servo track write device. A description of the same arrangement as that in the first embodiment will be omitted.

In this embodiment, the optical probe NCP has a windshield PW1 formed of a plate member, and the leaf spring member SP is surrounded by the windshield PW1. The windshield PW1 has a cutout portion from which that portion of the leaf spring member SP which is near the contact point between itself and magnetic head arm ARM1 is exposed. Hence, the area the leaf spring member receives wind can be reduced compared to the arrangement of the first embodiment. Hence, the arrangement of this embodiment is more invulnerable to wind.

Figure 6:
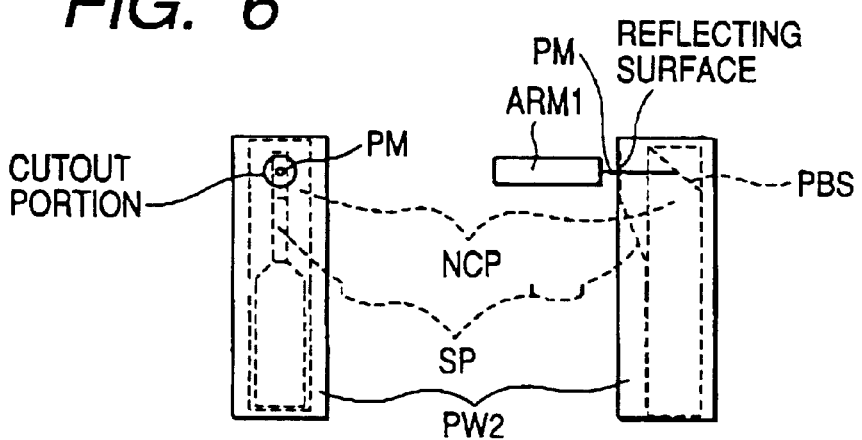
FIG. 6 is a schematic view of a glass probe of a sensor as a more characteristic feature than the first embodiment in a servo track signal write device according to the third embodiment of the present invention.

FIG. 6 is a partial schematic view of the third embodiment of the present invention. FIG. 6 is a schematic view of an optical probe NCP portion, which is more outstanding characteristic feature of the present invention than the first embodiment, in the servo track write device.

In this embodiment, the optical probe NCP has a tubular windshield PW2, which surrounds the reflecting surface. Furthermore, the leaf spring member SP has a pin member PM, which elastically contacts the object to be detected, on just the back side of the light irradiation point near the sensor probe. The tubular windshield PW2 has a hole which allows the pin member PM alone to protrude outside the windshield PW2. The windshield PW2 is added to the optical probe NCP. More specifically, the windshield PW2 from which only the contact point of the leaf spring member SP with the magnetic head arm ARM1 is exposed is added to reduce the influence of wind in the hard disk housing. In addition, the pin member PM is fixed to the leaf spring member SP to serve as a contact point with the magnetic head arm, and solely exposes itself from the windshield In this arrangement, the leaf spring member does not receive any wind since most of it does not expose outside the windshield. Hence, a sensor which is resistant to wind can be realized.

According to the aforementioned embodiments, when the respective components are set, as described above, an interference device, position detection device, and alignment device, which can detect position information of an object such as a magnetic head arm with high reliability and high precision and at high resolution without arranging any special member on the object side, can align the object without placing any specific member on the object side, and can stably measure position information of a magnetic head arm of a hard disk, whose rotational speed is becoming higher each year irrespective of an air flow in a hard disk housing, and a servo signal write device using them, can be achieved.

Especially, in order to reduce the influence of wind produced upon rotation of a disk which is rotating at high speed, since the leaf spring member is set to have a width equal to the spot size at the detection position of the light beam coming from the position measurement device, the leaf spring member can contact the magnetic head while reducing wind pressure acting on the leaf spring member, and the interference system measures distance to the reflecting surface formed on the leaf spring member, thus indirectly measuring the distance between the magnetic head arm and sensor probe.

When the width of the leaf spring member is reduced, since the torsional rigidity of the leaf spring member can be improved, and the positional relationship between the reflecting surface of the leaf spring member and glass probe can be maintained irrespective of alignment between the magnetic head arm and sensor probe, an interference signal can be stably output. When a windshield that exposes only the contact point of the leaf spring member with the magnetic head arm of the hard disk is added, the area the leaf spring receives wind in the hard disk can be further reduced, and the distance between the optical probe and magnetic head cam can be measured stably.

In addition, when the pin member is fixed to the leaf spring member to serve as a contact point with the magnetic head arm, and the windshield that exposes only the pin member is provided to the position measurement device, nearly all the influences of wind in the hard disk on the leaf spring can be removed. As described above, the effect of the present invention is to reduce or remove the influences of wind produced in the hard disk whose rotational speed is increasing year by year, and to allow easy position adjustment alignment between the magnetic head arm and sensor probe.

What is claimed is:

1. An interference device comprising:
    an elastic member which elastically contacts a portion of an object to be detected;
    a light source;
    an optical probe that splits an incoming light beam from said light source into two light beams, reflecting one of the two light beams with a reference reflecting surface, reflecting the other of the two light beams with a reflecting surface formed on said elastic member, and then mixing the two light beams; and
    a sensor that obtains an interference signal from the two light beams mixed by said optical probe, wherein position information of the object to be detected is obtained from the interference signal,
    wherein said elastic member has a width substantially the same as the diameter of the other of the two light beams, which becomes incident on the reflecting surface formed on said elastic member.

2. A device according to claim 1, further comprising a windshield which exposes only a vicinity of a light beam irradiation position of the reflecting surface formed on said elastic member.

3. A device according to claim 1, wherein said elastic member comprises a pin member on a portion that contacts the object to be detected, and said device further comprises a windshield which exposes a vicinity of said pin member.

4. An interference device comprising:
    an elastic member which elastically contacts a portion of an object to be detected;

a light source;

an optical probe that splits an incoming light beam from said light source into two light beams in a light transmission member, reflecting one of the two light beams with a reference reflecting surface, outputting the other of the two light beams from the light transmission member toward said elastic member and reflecting the other of the two light beams with a reflecting surface formed on said elastic member, and then mixing the two light beams in the light transmission member; and a sensor that obtains an interference signal from the two light beams mixed by said optical probe, wherein position information of the object to be detected is obtained from the interference signal, wherein said elastic member has a width substantially the same as the diameter of the other of the two light beams, which becomes incident on the reflecting surface formed on said elastic member.

5. A device according to claim 4, further comprising a windshield which exposes only a vicinity of a light beam irradiation position of the reflecting surface formed on said elastic member.

6. A device according to claim 4, wherein said elastic member comprises a pin member on a portion that contacts the object to be detected, and said device further comprises a windshield which exposes a vicinity of said pin member.

7. An alignment device comprising:

an elastic member which elastically contacts a portion of an object to be detected;

a light source;

an optical probe that splits an incoming light beam from said light source into two light beams, reflecting one of the two light beams with a reference reflecting surface, reflecting the other of the two light beams with a reflecting surface formed on said elastic member, and then mixing the two light beams;

a sensor that obtains an interference signal from the two light beams mixed by said optical probe; and a control system that controls a position of the object to be detected on the basis of the interface signal obtained by said sensor, wherein said elastic member has a width substantially the same as the diameter of the other of the two light beams, which becomes incident on the reflecting surface formed on said elastic member.

8. A device according to claim 7, wherein the object to be detected is a rotary arm of a rotary alignment device.

9. A signal write device comprising:

an elastic member which elastically contacts a portion of an arm that supports a magnetic head for writing information on a hard disk;

a light source;

an optical probe that splits an incoming light beam from said light source into two light beams, reflecting one of the two light beams with a reference reflecting surface, reflecting the other of the two light beams with a reflecting surface formed on said elastic member, and then mixing the two light beams;

a sensor that obtains an interference signal from the two light beams mixed by said optical probe;

a control system that controls a rotational position of the arm on the basis of the interface signal obtained by said sensor; and a signal system that writes a servo track signal on the hard disk via the magnetic head, wherein said elastic member has a width substantially the same as the diameter of the other of the two light beams, which becomes incident on the reflecting surface formed on said elastic member.

10. A signal write device comprising:

an elastic member which elastically contacts a portion of an arm that supports a magnetic head for writing information on a hard disk;

a light source;

an optical probe that splits an incoming light beam from said light source into two light beams in a light transmission member, reflecting one of the two light beams with a reference reflecting surface, outputting the other of the two light beams from the light transmission member toward said elastic member and reflecting the other of the two light beams with a reflecting surface formed on said elastic member, and then mixing the two light beams in the light transmission member;

a sensor that obtains an interference signal from the two light beams mixed by said optical probe;

a control system that controls a rotational position of the arm on the basis of the interface signal obtained by said sensor; and a signal system that writes a servo track signal on the hard disk via the magnetic head, wherein said elastic member has a width substantially the same as the diameter of the other of the two light beams, which becomes incident on the reflecting surface formed on said elastic member.

11. A device according to claim 10, further comprising a windshield which exposes only a vicinity of a light beam irradiation position of the reflecting surface formed on said elastic member.

12. A device according to claim 10, wherein said elastic member comprises a pin member on a portion that contacts the object to be detected, and said device further comprises a windshield which exposes a vicinity of said pin member.

* * * * *

UNITED STATES PATENT AND TRADEMARK OFFICE
CERTIFICATE OF CORRECTION

PATENT NO.     : 6,493,170 B1                                                Page 1 of 1
DATED          : December 10, 2002
INVENTOR(S)    : Shigeki Kato et al.

It is certified that error appears in the above-identified patent and that said Letters Patent is hereby corrected as shown below:

Column 1,
Line 8, "device." should read -- device --; and
Line 23, "RD," should read -- HD, --.

Column 2,
Line 35, "ARM1" should read -- ARM1, --.

Column 3,
Line 59, "d rive" should read -- drive --.

Column 4,
Line 61, "beame" should read --beam --.

Column 5,
Line 60, "From" should read -- from --.

Column 7,
Line 25, "Lissjous" should read -- Lissajous --; and
Line 39, "distznce" should read -- distance --.

Column 9,
Line 53, "windshield" should read -- windshield PW2. --.

Signed and Sealed this

Twenty-third Day of March, 2004

JON W. DUDAS
*Acting Director of the United States Patent and Trademark Office*